US011498750B2

United States Patent
Krüger et al.

(10) Patent No.: US 11,498,750 B2
(45) Date of Patent: Nov. 15, 2022

(54) FILTER ELEMENT HAVING A CUT-OUT

(71) Applicant: GCS GERMAN CAPSULE SOLUTION GMBH, Bergisch Gladbach (DE)

(72) Inventors: Marc Krüger, Bergisch Gladbach (DE); Günter Empl, Bergisch Gladbach (DE)

(73) Assignee: GCS German Capsule Solution GmbH, Bergisch Gladbach (DE)

(*) Notice: Subject to any disclaimer, the term of this patent is extended or adjusted under 35 U.S.C. 154(b) by 300 days.

(21) Appl. No.: 16/903,548

(22) Filed: Jun. 17, 2020

(65) Prior Publication Data
US 2020/0317438 A1 Oct. 8, 2020

Related U.S. Application Data

(62) Division of application No. 15/742,991, filed as application No. PCT/EP2016/066617 on Jul. 13, 2016, now Pat. No. 10,737,876.

(30) Foreign Application Priority Data

Jul. 13, 2015 (DE) .......................... 102015111319.8

(51) Int. Cl.
*B29C 65/08* (2006.01)
*B65D 85/804* (2006.01)
*B65B 29/02* (2006.01)

(52) U.S. Cl.
CPC .......... *B65D 85/8061* (2020.05); *B29C 65/08* (2013.01); *B29C 65/082* (2013.01); *B65B 29/022* (2017.08)

(58) Field of Classification Search
CPC ...... B65B 29/022; B29C 65/08; B29C 65/082
(Continued)

(56) References Cited

U.S. PATENT DOCUMENTS

| 923,706 A | 1/1909 | Richey et al. |
| 1,051,426 A | 2/1911 | Matheson |

(Continued)

FOREIGN PATENT DOCUMENTS

| AU | 2011281237 A1 | 2/2013 |
| AU | 2014203212 A1 | 7/2014 |

(Continued)

OTHER PUBLICATIONS

International Search Report and Written Opinion for International Application No. PCT/EP2016/066617, dated Oct. 5, 2016.
(Continued)

*Primary Examiner* — James D Sells
(74) *Attorney, Agent, or Firm* — The Dobrusin Law Firm, P.C.

(57) ABSTRACT

The invention relates to a single serve capsule (1) for producing a beverage, comprising a capsule body (2). Said capsule body has a capsule bottom (3), a sidewall (22), a collar edge (5), and a cover (6). A cavity (100) for accommodating a beverage substrate in the form of a powder, granules, cut leaves or liquid is formed between the capsule bottom and the cover. A filter element (7) is arranged in the cavity, and the filter element is produced of non-woven fiber material. The filter element has a cut-out in which no filtering material is provided. The present invention also relates to a method for producing a single serve capsule.

19 Claims, 4 Drawing Sheets

(58) Field of Classification Search
USPC .................................................. 156/73.1
See application file for complete search history.

(56) References Cited

U.S. PATENT DOCUMENTS

| | | |
|---|---|---|
| 1,036,589 A | 11/1911 | Eggleston |
| 1,329,461 A | 2/1920 | Frantz |
| 1,485,200 A | 2/1924 | Roberts et al. |
| 1,689,665 A | 10/1928 | Cramp |
| 2,732,919 A | 1/1956 | Johnson |
| 2,778,739 A | 1/1957 | Rodth |
| 2,847,726 A | 8/1958 | Frick |
| 3,039,153 A | 6/1962 | Dusing |
| 3,183,096 A | 5/1965 | Hiscock |
| 3,261,129 A | 7/1966 | Brydolf et al. |
| 3,327,428 A | 6/1967 | Horton et al. |
| 3,363,588 A | 1/1968 | Harrington et al. |
| 3,416,183 A | 12/1968 | Martin |
| 3,473,266 A | 10/1969 | Miller |
| 3,480,989 A | 12/1969 | Edeus |
| 3,611,637 A | 10/1971 | Saino |
| 3,631,793 A | 1/1972 | Bednartz |
| 3,640,727 A | 2/1972 | Heusinkveld |
| 4,081,880 A | 4/1978 | Edeus |
| 4,298,649 A | 11/1981 | Meitner |
| 4,325,204 A | 4/1982 | Martine |
| 4,404,770 A | 9/1983 | Markus |
| 4,424,605 A | 1/1984 | Squires et al. |
| 4,452,014 A | 6/1984 | Markus |
| 4,488,387 A | 12/1984 | Foti |
| 4,513,535 A | 4/1985 | Uphoff |
| 4,534,985 A | 8/1985 | Gasau |
| 4,540,595 A | 9/1985 | Acitelli et al. |
| 4,633,614 A | 1/1987 | Van Weelden |
| 4,651,469 A | 3/1987 | Ngian et al. |
| 4,644,151 A | 5/1987 | Piet |
| 4,676,482 A | 6/1987 | Reece |
| 4,680,828 A | 7/1987 | Cook et al. |
| 4,742,645 A | 5/1988 | Johnston |
| 4,859,337 A | 8/1989 | Woltermann |
| 4,860,645 A | 8/1989 | Van Der Lijn et al. |
| 4,867,993 A | 9/1989 | Nordskog |
| 4,881,346 A | 11/1989 | Block |
| 4,936,049 A | 6/1990 | Hansen |
| 4,976,179 A | 12/1990 | Lacrouts-Cazenave |
| 4,995,310 A | 2/1991 | Van Der Lijn et al. |
| 5,012,629 A | 5/1991 | Rehman et al. |
| 5,028,769 A | 7/1991 | Claypool et al. |
| 5,079,872 A | 1/1992 | Short |
| 5,108,768 A | 4/1992 | So |
| 5,242,702 A | 9/1993 | Fond |
| 5,243,164 A | 9/1993 | Erickson et al. |
| 5,251,758 A | 10/1993 | Kolacek |
| 5,285,041 A | 2/1994 | Wright |
| 5,301,468 A | 4/1994 | Kameaki |
| 5,325,765 A | 7/1994 | Sylvan et al. |
| 5,351,442 A | 10/1994 | Gingras |
| 5,352,765 A | 10/1994 | Drent et al. |
| 5,450,693 A | 9/1995 | Tarrega |
| 5,460,078 A | 10/1995 | Weller |
| 5,461,829 A | 10/1995 | Lehto et al. |
| 5,472,719 A | 12/1995 | Favre |
| 5,496,573 A | 3/1996 | Tsuji et al. |
| 5,501,945 A | 3/1996 | Kanakkanatt |
| 5,535,765 A | 7/1996 | Takashima |
| 5,566,505 A | 10/1996 | Kameaki |
| 5,601,716 A | 2/1997 | Heinrich et al. |
| 5,637,850 A | 6/1997 | Honda |
| 5,638,740 A | 6/1997 | Cai |
| 5,656,311 A | 8/1997 | Fond |
| 5,672,368 A | 9/1997 | Perkins |
| 5,677,522 A | 10/1997 | Rice et al. |
| 5,725,261 A | 3/1998 | Rahn |
| 5,742,979 A | 4/1998 | Garcia-Hernando |
| 5,840,189 A | 11/1998 | Sylvan et al. |
| 5,888,549 A | 3/1999 | Buchholz et al. |
| 5,895,672 A | 4/1999 | Cooper |
| 5,917,165 A | 6/1999 | Platt et al. |
| 5,941,055 A | 8/1999 | Coates |
| 5,948,455 A | 9/1999 | Schaeffer et al. |
| 5,980,743 A | 11/1999 | Bairischer |
| 5,994,677 A | 11/1999 | Akerlind |
| 6,082,499 A | 7/2000 | O'Donnell |
| 6,153,026 A | 11/2000 | Michotte |
| 6,189,438 B1 | 2/2001 | Bielfeldt et al. |
| 6,199,780 B1 | 3/2001 | Görlitz |
| 6,202,929 B1 | 3/2001 | Verschuur et al. |
| 6,250,016 B1 | 6/2001 | Gravel |
| 6,289,643 B1 | 9/2001 | Bonar |
| 6,299,926 B1 | 10/2001 | Balakrishnan et al. |
| 6,440,256 B1 | 8/2002 | Gordon et al. |
| 6,451,332 B1 | 9/2002 | Tanaka et al. |
| 6,589,577 B2 | 7/2003 | Lazaris et al. |
| 6,598,800 B1 | 7/2003 | Schmit et al. |
| 6,607,762 B2 | 8/2003 | Lazaris et al. |
| 6,627,244 B2 | 9/2003 | Omura |
| 6,645,537 B2 | 11/2003 | Sweeney et al. |
| 6,655,260 B2 | 12/2003 | Lazaris |
| 6,706,652 B2 | 3/2004 | Groten et al. |
| 6,861,086 B2 | 3/2005 | Buckingham et al. |
| 6,871,448 B1 | 3/2005 | Kline |
| 6,948,420 B2 | 9/2005 | Kirschner et al. |
| 6,994,879 B2 | 2/2006 | Cirigliano et al. |
| 7,408,094 B2 | 8/2008 | Little et al. |
| 7,444,925 B2 | 11/2008 | Mahlich |
| 7,464,518 B2 | 12/2008 | Ansinn |
| 7,543,527 B2 | 6/2009 | Schmed |
| 7,552,672 B2 | 6/2009 | Schmed |
| 7,595,870 B2 | 9/2009 | Ringlien |
| 7,673,558 B2 | 3/2010 | Panesar et al. |
| 7,678,451 B2 | 3/2010 | Gelissen et al. |
| 7,685,930 B2 | 3/2010 | Mandralis et al. |
| 7,703,381 B2 | 4/2010 | Liverani et al. |
| 7,712,258 B2 | 5/2010 | Ewing et al. |
| 7,743,557 B2 | 6/2010 | Liao |
| 7,763,295 B2 | 7/2010 | Mayr et al. |
| 7,779,578 B2 | 8/2010 | Gray |
| 7,815,953 B2 | 10/2010 | Mastropasqua et al. |
| 7,935,646 B2 | 5/2011 | Viazmensky et al. |
| 7,946,217 B2 | 5/2011 | Favre et al. |
| 7,981,451 B2 | 7/2011 | Ozanne |
| 8,039,029 B2 | 10/2011 | Ozanne |
| 8,039,034 B2 | 10/2011 | Ozanne |
| 8,088,423 B2 | 1/2012 | Ohresser et al. |
| 8,109,200 B2 | 2/2012 | Hansen |
| 8,114,461 B2 | 2/2012 | Perlman et al. |
| 8,163,318 B2 | 4/2012 | Ozanne et al. |
| 8,168,908 B2 | 5/2012 | Heimann |
| 8,257,766 B2 | 9/2012 | Yoakim et al. |
| 8,276,639 B2 | 10/2012 | Binacchi |
| 8,307,754 B2 | 11/2012 | Trenite et al. |
| 8,322,271 B2 | 12/2012 | Glucksman et al. |
| 8,361,527 B2 | 1/2013 | Winkler et al. |
| 8,443,549 B2 | 5/2013 | Salvietti et al. |
| 8,474,368 B2 | 7/2013 | Kilber et al. |
| 8,491,948 B2 | 7/2013 | Ozanne et al. |
| 8,491,976 B2 | 7/2013 | Sato et al. |
| 8,505,440 B2 | 8/2013 | Kirschner et al. |
| 8,512,886 B2 | 8/2013 | Ozanne |
| 8,579,006 B2 | 11/2013 | Levin |
| 8,734,881 B2 | 5/2014 | Yoakim et al. |
| 8,747,775 B2 | 6/2014 | Sandvick |
| 8,794,125 B1 | 8/2014 | Rivera |
| 8,906,436 B2 | 12/2014 | Nowak |
| 8,916,220 B2 | 12/2014 | Mahlich et al. |
| 8,956,672 B2 | 2/2015 | Yoakim et al. |
| 8,960,076 B2 | 2/2015 | Epars et al. |
| 9,049,958 B2 | 6/2015 | Fischer |
| 9,072,402 B2 | 7/2015 | Ryser |
| 9,079,705 B2 | 7/2015 | Digiuni |
| 9,145,730 B1 | 9/2015 | Santamaria |
| 9,150,347 B2 | 10/2015 | Scheiber |
| 9,204,751 B2 | 12/2015 | Peterson |
| 9,216,854 B2 | 12/2015 | Schreiber |

(56) References Cited

U.S. PATENT DOCUMENTS

| | | |
|---|---|---|
| 9,226,611 B2 | 1/2016 | Yoakim et al. |
| 9,242,791 B2 | 1/2016 | Denisart et al. |
| 9,271,602 B2 | 3/2016 | Beaulieu et al. |
| 9,277,837 B2 | 3/2016 | Yoakim et al. |
| 9,290,317 B2 | 3/2016 | Quinn et al. |
| 9,295,278 B2 | 3/2016 | Nowak |
| 9,357,791 B2 | 6/2016 | Fountain et al. |
| 9,359,126 B2 | 6/2016 | Wong et al. |
| 9,359,128 B2 | 6/2016 | Mahlich |
| 9,392,902 B2 | 7/2016 | Parentes et al. |
| 9,394,101 B2 | 7/2016 | Empl |
| 9,399,546 B2 | 7/2016 | Abegglen et al. |
| 9,409,703 B2 | 8/2016 | Krüger et al. |
| 9,409,704 B2 | 8/2016 | Digiuni et al. |
| 9,415,931 B2 | 8/2016 | Gerbaulet et al. |
| 9,428,328 B2 | 8/2016 | Trombetta et al. |
| 9,428,329 B2 | 8/2016 | Trombetta et al. |
| 9,434,525 B2 | 9/2016 | Fabozzi et al. |
| 9,486,108 B1 | 11/2016 | Douglas et al. |
| 9,598,230 B2 | 3/2017 | Schmed et al. |
| 9,603,478 B2 | 3/2017 | Deleo |
| 9,656,798 B2 | 5/2017 | Kamerbeek et al. |
| 9,808,112 B2 | 11/2017 | Favero et al. |
| 9,969,546 B2 | 5/2018 | Krüger |
| 10,011,421 B2 | 7/2018 | Bartoli et al. |
| 10,111,554 B2 | 10/2018 | Roberts et al. |
| 10,343,838 B2 | 7/2019 | Empl |
| 10,376,089 B2 | 8/2019 | Deuber et al. |
| 10,450,130 B2 | 10/2019 | Hansen |
| 10,455,974 B2 | 10/2019 | Talon |
| 10,472,165 B2 | 11/2019 | Empl |
| 10,737,876 B2 * | 8/2020 | Krüger ............... B65B 29/022 |
| 2001/0014393 A1 | 8/2001 | Groten et al. |
| 2001/0038204 A1 | 11/2001 | Nojima et al. |
| 2001/0047724 A1 | 12/2001 | Lazaris |
| 2001/0048957 A1 | 12/2001 | Lazaris et al. |
| 2002/0020659 A1 | 2/2002 | Sweeney |
| 2002/0048621 A1 | 4/2002 | Boyd et al. |
| 2002/0085164 A1 | 7/2002 | Stanford-Clark |
| 2002/0088807 A1 | 7/2002 | Perkovic et al. |
| 2002/0104373 A1 | 8/2002 | Ishihara et al. |
| 2002/0110626 A1 | 8/2002 | Buckingham et al. |
| 2003/0005826 A1 | 1/2003 | Sargent et al. |
| 2003/0033938 A1 | 2/2003 | Halliday et al. |
| 2003/0039731 A1 | 2/2003 | Dalton et al. |
| 2003/0121979 A1 | 7/2003 | Haens et al. |
| 2003/0148096 A1 | 8/2003 | Groten et al. |
| 2003/0172813 A1 | 9/2003 | Schifferle |
| 2003/0222089 A1 | 12/2003 | Hale |
| 2004/0045443 A1 | 3/2004 | Lazaris et al. |
| 2004/0089158 A1 | 5/2004 | Mahlich |
| 2004/0089602 A1 | 5/2004 | Heinrich et al. |
| 2004/0115310 A1 | 6/2004 | Yoakim et al. |
| 2004/0118295 A1 | 6/2004 | Angeles |
| 2004/0142070 A1 | 7/2004 | Haen |
| 2004/0155113 A1 | 8/2004 | Urano et al. |
| 2004/0182250 A1 | 9/2004 | Halliday et al. |
| 2004/0228955 A1 | 11/2004 | Denisart et al. |
| 2005/0000164 A1 | 1/2005 | Jacobs |
| 2005/0016383 A1 | 1/2005 | Kirschner et al. |
| 2005/0045566 A1 | 3/2005 | Larkin et al. |
| 2005/0051478 A1 | 3/2005 | Karanikos et al. |
| 2005/0056153 A1 | 3/2005 | Nottingham et al. |
| 2005/0061478 A1 | 3/2005 | Huang |
| 2005/0136155 A1 | 6/2005 | Jordan et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0158437 A1 | 7/2005 | Itaya et al. |
| 2005/0160919 A1 | 7/2005 | Balkau |
| 2005/0166763 A1 | 8/2005 | Scarchilli et al. |
| 2005/0183581 A1 | 8/2005 | Kirschner et al. |
| 2005/0235571 A1 | 10/2005 | Ewing et al. |
| 2005/0266122 A1 | 12/2005 | Franceschi |
| 2006/0010744 A1 | 1/2006 | Schumacher |
| 2006/0032427 A1 | 2/2006 | Ishii et al. |
| 2006/0065127 A1 | 3/2006 | Dalton et al. |
| 2006/0074165 A1 | 4/2006 | Gelissen et al. |
| 2006/0084344 A1 | 4/2006 | Bonneh |
| 2006/0107841 A1 | 5/2006 | Schifferle |
| 2006/0110507 A1 | 5/2006 | Yoakim et al. |
| 2006/0148968 A1 | 7/2006 | Van Duijnhoven et al. |
| 2006/0194004 A1 | 8/2006 | Niemoller et al. |
| 2006/0228447 A1 | 10/2006 | Ganesan et al. |
| 2006/0236871 A1 | 10/2006 | Ternite et al. |
| 2007/0148290 A1 | 6/2007 | Ternite et al. |
| 2007/0157821 A1 | 7/2007 | Panesar et al. |
| 2007/0181005 A1 | 8/2007 | Kirschner et al. |
| 2007/0181412 A1 | 8/2007 | Raunig |
| 2007/0203587 A1 | 8/2007 | Erlandsson et al. |
| 2007/0257118 A1 | 11/2007 | Riley et al. |
| 2007/0283640 A1 | 12/2007 | Shivak et al. |
| 2008/0024536 A1 | 1/2008 | Hirano et al. |
| 2008/0028946 A1 | 2/2008 | Kirschner et al. |
| 2008/0038441 A1 | 2/2008 | Kirschner |
| 2008/0050488 A1 | 2/2008 | Koeling et al. |
| 2008/0085356 A1 | 4/2008 | Colliver et al. |
| 2008/0148948 A1 | 6/2008 | Evers et al. |
| 2008/0187638 A1 | 8/2008 | Hansen |
| 2008/0245236 A1 | 10/2008 | Ternite et al. |
| 2008/0299262 A1 | 12/2008 | Reati |
| 2008/0302251 A1 | 12/2008 | Rijskamp et al. |
| 2009/0004343 A1 | 1/2009 | Xiong et al. |
| 2009/0007793 A1 | 1/2009 | Glucksman et al. |
| 2009/0007796 A1 | 1/2009 | Ricotti |
| 2009/0092711 A1 | 4/2009 | Ninh et al. |
| 2009/0126577 A1 | 5/2009 | Ternite |
| 2009/0136626 A1 | 5/2009 | Mueller |
| 2009/0173043 A1 | 7/2009 | Bloome et al. |
| 2009/0211458 A1 | 8/2009 | Denisart et al. |
| 2009/0211713 A1 | 8/2009 | Binacchi |
| 2009/0285953 A1 | 11/2009 | Reniers |
| 2009/0289121 A1 | 11/2009 | Maeda et al. |
| 2009/0291379 A1 | 11/2009 | Oota et al. |
| 2009/0324788 A1 | 12/2009 | Roy et al. |
| 2009/0324791 A1 | 12/2009 | Ohresser et al. |
| 2010/0000667 A1 | 1/2010 | Funnell |
| 2010/0028495 A1 | 2/2010 | Novak et al. |
| 2010/0050880 A1 | 3/2010 | Suter et al. |
| 2010/0051532 A1 | 3/2010 | Wawrla et al. |
| 2010/0054532 A1 | 3/2010 | Mitte et al. |
| 2010/0078480 A1 | 4/2010 | Aker |
| 2010/0108541 A1 | 5/2010 | Venturi |
| 2010/0132564 A1 | 6/2010 | Ozanne et al. |
| 2010/0178404 A1 | 7/2010 | Yoakim et al. |
| 2010/0181378 A1 | 7/2010 | Hayakawa et al. |
| 2010/0196545 A1 | 8/2010 | Buffet et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260915 A1 | 10/2010 | Young |
| 2010/0263329 A1 | 10/2010 | Nash |
| 2010/0264640 A1 | 10/2010 | Lane et al. |
| 2010/0288131 A1 | 11/2010 | Kilber et al. |
| 2010/0288133 A1 | 11/2010 | Litzka et al. |
| 2010/0303964 A1 | 12/2010 | Beaulieu et al. |
| 2010/0308397 A1 | 12/2010 | Ariyoshi |
| 2011/0005399 A1 | 1/2011 | Epars et al. |
| 2011/0020500 A1 | 1/2011 | Eichler et al. |
| 2011/0033580 A1 | 2/2011 | Biesheuvel et al. |
| 2011/0041702 A1 | 2/2011 | Yoakim |
| 2011/0064852 A1 | 3/2011 | Mann |
| 2011/0076361 A1 | 3/2011 | Peterson et al. |
| 2011/0097450 A1 | 4/2011 | Krüger |
| 2011/0142996 A1 | 6/2011 | Krüger |
| 2011/0185910 A1 | 8/2011 | Ryser |
| 2011/0186450 A1 | 8/2011 | Bonacci |
| 2011/0189350 A1 | 8/2011 | Van Belleghem et al. |
| 2011/0212225 A1 | 9/2011 | Mariller |
| 2011/0217421 A1 | 9/2011 | Parentes et al. |
| 2011/0250333 A1 | 10/2011 | Ozanne |
| 2011/0250812 A1 | 10/2011 | Pourdeyhimi et al. |
| 2011/0303095 A1 | 12/2011 | Fu et al. |
| 2011/0308397 A1 | 12/2011 | Sinot et al. |

(56) References Cited

U.S. PATENT DOCUMENTS

| | | |
|---|---|---|
| 2012/0006685 A1 | 1/2012 | Van Engelen |
| 2012/0015080 A1 | 1/2012 | Roulin et al. |
| 2012/0058226 A1 | 3/2012 | Winkler et al. |
| 2012/0060697 A1 | 3/2012 | Ozanne |
| 2012/0070542 A1 | 3/2012 | Camera et al. |
| 2012/0070543 A1 | 3/2012 | Mahlich |
| 2012/0070551 A1 | 3/2012 | Mahlich |
| 2012/0097041 A1 | 4/2012 | Bucher et al. |
| 2012/0097602 A1 | 4/2012 | Tedford |
| 2012/0100264 A1 | 4/2012 | Bucher et al. |
| 2012/0109186 A1 | 5/2012 | Parrott et al. |
| 2012/0121765 A1 | 5/2012 | Kamerbeek et al. |
| 2012/0123106 A1 | 5/2012 | Joos |
| 2012/0126834 A1 | 5/2012 | Kleinhans |
| 2012/0148709 A1 | 6/2012 | Kamerbeek et al. |
| 2012/0177788 A1 | 7/2012 | Seid et al. |
| 2012/0183657 A1 | 7/2012 | Marina et al. |
| 2012/0195155 A1 | 8/2012 | Gennai et al. |
| 2012/0201933 A1 | 8/2012 | Dran et al. |
| 2012/0207893 A1 | 8/2012 | Krüger |
| 2012/0207895 A1 | 8/2012 | Rivera |
| 2012/0251668 A1 | 10/2012 | Wong et al. |
| 2012/0251672 A1 | 10/2012 | Kamerbeek et al. |
| 2012/0258210 A1 | 10/2012 | Wong et al. |
| 2012/0295234 A1 | 11/2012 | Rognon et al. |
| 2012/0308688 A1 | 12/2012 | Peterson et al. |
| 2013/0055903 A1 | 3/2013 | Deuber |
| 2013/0059039 A1 | 3/2013 | Trombetta et al. |
| 2013/0064929 A1 | 3/2013 | Jarisch et al. |
| 2013/0064937 A1 | 3/2013 | Jarisch et al. |
| 2013/0084363 A1 | 4/2013 | Krüger et al. |
| 2013/0084376 A1 | 4/2013 | Fischer et al. |
| 2013/0087051 A1 | 4/2013 | Frydman |
| 2013/0099597 A1 | 4/2013 | Perentes et al. |
| 2013/0101716 A1 | 4/2013 | Beaulieu et al. |
| 2013/0122153 A1 | 5/2013 | Ferrier et al. |
| 2013/0122167 A1 | 5/2013 | Winkler et al. |
| 2013/0125762 A1 | 5/2013 | Dogan et al. |
| 2013/0129872 A1 | 5/2013 | Krüger et al. |
| 2013/0136828 A1 | 5/2013 | Anghileri |
| 2013/0149424 A1 | 6/2013 | Fischer |
| 2013/0156897 A1 | 6/2013 | Goldstein |
| 2013/0156899 A1 | 6/2013 | Quinn et al. |
| 2013/0206011 A1 | 8/2013 | Ozanne et al. |
| 2013/0209618 A1 | 8/2013 | Trombetta et al. |
| 2013/0209619 A1 | 8/2013 | Mahlich |
| 2013/0209620 A1 | 8/2013 | Ozanne et al. |
| 2013/0209622 A1 | 8/2013 | Fountain et al. |
| 2013/0216663 A1 | 8/2013 | Dogan et al. |
| 2013/0224343 A1 | 8/2013 | Tremblay |
| 2013/0230627 A1 | 9/2013 | Hansen et al. |
| 2013/0243910 A1 | 9/2013 | Krüger et al. |
| 2013/0312619 A1 | 11/2013 | Spiegel et al. |
| 2013/0323366 A1 | 12/2013 | Gerbaulet et al. |
| 2013/0327223 A1 | 12/2013 | Bartoli et al. |
| 2014/0004231 A1 | 1/2014 | Norton et al. |
| 2014/0017359 A1 | 1/2014 | Krüger et al. |
| 2014/0026761 A1 | 1/2014 | Bartoli et al. |
| 2014/0127364 A1 | 5/2014 | Fu et al. |
| 2014/0141128 A1 | 5/2014 | Trombetta et al. |
| 2014/0141129 A1 | 5/2014 | Greene |
| 2014/0157993 A1 | 6/2014 | Brouwer et al. |
| 2014/0161936 A1 | 6/2014 | Trombetta et al. |
| 2014/0178538 A1 | 6/2014 | Husband et al. |
| 2014/0196608 A1 | 7/2014 | Amrein et al. |
| 2014/0220191 A1 | 8/2014 | Kelly et al. |
| 2014/0224130 A1 | 8/2014 | Castellani et al. |
| 2014/0230370 A1 | 8/2014 | Bianchi |
| 2014/0263033 A1 | 9/2014 | Fu et al. |
| 2014/0272018 A1 | 9/2014 | Koller et al. |
| 2014/0287104 A1 | 9/2014 | Austin et al. |
| 2014/0287105 A1 | 9/2014 | Husband et al. |
| 2014/0346022 A1 | 11/2014 | Keller et al. |
| 2014/0348984 A1 | 11/2014 | Zeller et al. |
| 2014/0370181 A1 | 12/2014 | Young et al. |
| 2015/0010680 A9 | 1/2015 | Mahlich |
| 2015/0020481 A1 | 1/2015 | Hodler |
| 2015/0029702 A1 | 1/2015 | Foley |
| 2015/0056331 A1 | 2/2015 | Rivera |
| 2015/0056340 A1 | 2/2015 | Trombetta et al. |
| 2015/0056351 A1 | 2/2015 | Deuber |
| 2015/0079241 A1 | 3/2015 | Mahlich |
| 2015/0119220 A1 | 4/2015 | Rea et al. |
| 2015/0128525 A1 | 5/2015 | Bartoli et al. |
| 2015/0132441 A1 | 5/2015 | Accursi |
| 2015/0157164 A1 | 6/2015 | Digiuni |
| 2015/0158665 A1 | 6/2015 | Krüger et al. |
| 2015/0158666 A1 | 6/2015 | Krüger et al. |
| 2015/0166204 A1 | 6/2015 | Rea et al. |
| 2015/0173558 A1 | 6/2015 | Cross et al. |
| 2015/0175347 A1 | 6/2015 | Empl |
| 2015/0201790 A1 | 7/2015 | Smith et al. |
| 2015/0239652 A1 | 8/2015 | Trombetta et al. |
| 2015/0239653 A1 | 8/2015 | Dogan et al. |
| 2015/0246741 A1 | 9/2015 | Hansen et al. |
| 2015/0274411 A1 | 10/2015 | Krüger |
| 2015/0297021 A1 | 10/2015 | Bugnano et al. |
| 2015/0297023 A1 | 10/2015 | Hansen et al. |
| 2015/0314954 A1 | 11/2015 | Empl |
| 2015/0329282 A1 | 11/2015 | Bartoli et al. |
| 2015/0344220 A1 | 12/2015 | Sanders |
| 2015/0353275 A1 | 12/2015 | Accursi |
| 2015/0375926 A1 | 12/2015 | Fischer |
| 2016/0001968 A1 | 1/2016 | Krüger et al. |
| 2016/0037961 A1 | 2/2016 | Digiuni |
| 2016/0045060 A1 | 2/2016 | Flick |
| 2016/0058234 A1 | 3/2016 | Eppler et al. |
| 2016/0066591 A1 | 3/2016 | Halliday et al. |
| 2016/0075506 A1 | 3/2016 | Chapman et al. |
| 2016/0194146 A1 | 7/2016 | Schelch et al. |
| 2016/0207696 A9 | 7/2016 | Trombetta et al. |
| 2016/0242594 A1 | 8/2016 | Empl et al. |
| 2016/0251150 A1 | 9/2016 | Macchi et al. |
| 2016/0255987 A1 | 9/2016 | Dw Graaff et al. |
| 2016/0325921 A1 | 11/2016 | Empl |
| 2016/0332759 A1 | 11/2016 | Trombetta et al. |
| 2016/0340110 A1 | 11/2016 | Trombetta et al. |
| 2017/0020329 A1 | 1/2017 | Douglas et al. |
| 2017/0027374 A1 | 2/2017 | Smith et al. |
| 2017/0055757 A1 | 3/2017 | Fu et al. |
| 2017/0231421 A1 | 8/2017 | Talon |
| 2017/0362020 A1 | 12/2017 | Hanneson et al. |
| 2018/0105355 A1 | 4/2018 | Harif |
| 2018/0194545 A1 | 7/2018 | Bisio |
| 2018/0303281 A1 | 10/2018 | Carr et al. |
| 2019/0208950 A1 | 7/2019 | Wong et al. |

FOREIGN PATENT DOCUMENTS

| | | |
|---|---|---|
| CA | 2436389 A1 | 8/2002 |
| CA | 2399290 C | 1/2006 |
| CA | 2399283 C | 5/2007 |
| CA | 2661921 A1 | 3/2008 |
| CA | 2763746 A1 | 3/2010 |
| CA | 2784752 C | 6/2011 |
| CA | 2662071 C | 7/2011 |
| CA | 2824135 A1 | 12/2011 |
| CA | 2810237 A1 | 3/2012 |
| CA | 2531544 C | 5/2012 |
| CA | 2662069 C | 1/2013 |
| CA | 2785843 A1 | 2/2013 |
| CA | 2788283 A1 | 3/2013 |
| CA | 2850010 A1 | 5/2013 |
| CA | 2866119 A1 | 9/2013 |
| CA | 2872667 A1 | 11/2013 |
| CA | 2874025 A1 | 12/2013 |
| CA | 2877090 A1 | 1/2014 |
| CA | 2888658 C | 6/2014 |
| CA | 2898173 A1 | 8/2014 |
| CA | 2902231 A1 | 8/2014 |
| CA | 2901582 A1 | 11/2014 |
| CA | 2832794 C | 3/2016 |
| CA | 2833096 C | 5/2016 |
| CN | 101016667 A | 8/2007 |

(56) References Cited

FOREIGN PATENT DOCUMENTS

| | | |
|---|---|---|
| CN | 101043835 A | 9/2007 |
| CN | 101263066 A | 9/2008 |
| CN | 161646613 A | 2/2010 |
| CN | 101828840 A | 9/2010 |
| CN | 101970314 A | 2/2011 |
| CN | 101992905 A | 3/2011 |
| CN | 102379630 A | 3/2012 |
| CN | 102574631 A | 7/2012 |
| CN | 102574633 A | 7/2012 |
| CN | 102741135 A | 10/2012 |
| CN | 102741136 A | 10/2012 |
| CN | 102958408 A | 3/2013 |
| CN | 204048139 U | 12/2014 |
| CN | 104334473 A | 2/2015 |
| CN | 104411600 A | 3/2015 |
| CN | 104603029 A | 5/2015 |
| CN | 104619607 A | 5/2015 |
| DE | 1207866 B | 12/1965 |
| DE | 1221960 B | 7/1966 |
| DE | 3100115 A1 | 11/1981 |
| DE | 69615001 T2 | 3/2002 |
| DE | 202006003115 U1 | 5/2006 |
| DE | 102006004329 A1 | 8/2007 |
| DE | 202009014945 U1 | 9/2010 |
| DE | 202010007919 U1 | 11/2010 |
| DE | 102010027485 A1 | 1/2012 |
| DE | 102010034206 A1 | 2/2012 |
| DE | 202012101513 U1 | 5/2012 |
| DE | 102011010534 A1 | 8/2012 |
| DE | 102011115833 A1 | 4/2013 |
| DE | 102012105282 A1 | 12/2013 |
| DE | 102012110446 A1 | 1/2014 |
| DE | 102014018470 A1 | 6/2016 |
| EP | 0224297 A1 | 6/1987 |
| EP | 0244339 A1 | 11/1987 |
| EP | 0338479 A1 | 10/1989 |
| EP | 0468078 A1 | 1/1992 |
| EP | 0468079 A1 | 1/1992 |
| EP | 0656224 A1 | 6/1995 |
| EP | 0859467 A1 | 8/1998 |
| EP | 0865749 A1 | 9/1998 |
| EP | 0923865 A2 | 6/1999 |
| EP | 1118305 A2 | 7/2001 |
| EP | 1129623 A1 | 9/2001 |
| EP | 1221418 A1 | 7/2002 |
| EP | 1263661 A1 | 12/2002 |
| EP | 1344722 A1 | 9/2003 |
| EP | 1344724 A1 | 9/2003 |
| EP | 1363501 A2 | 11/2003 |
| EP | 1471012 A2 | 10/2004 |
| EP | 1555219 A1 | 7/2005 |
| EP | 1559351 A2 | 8/2005 |
| EP | 1566127 A2 | 8/2005 |
| EP | 1567594 A1 | 8/2005 |
| EP | 1567595 A1 | 8/2005 |
| EP | 1586534 A1 | 10/2005 |
| EP | 1710173 A1 | 10/2006 |
| EP | 1792850 B1 | 6/2007 |
| EP | 1796516 A2 | 6/2007 |
| EP | 1849718 A1 | 10/2007 |
| EP | 1882432 B1 | 1/2008 |
| EP | 1892199 A1 | 2/2008 |
| EP | 1974638 A1 | 10/2008 |
| EP | 1997748 A1 | 12/2008 |
| EP | 2158829 A1 | 3/2010 |
| EP | 1882431 B1 | 4/2010 |
| EP | 2218653 A1 | 8/2010 |
| EP | 2230195 A1 | 9/2010 |
| EP | 2239211 A1 | 10/2010 |
| EP | 2284102 A1 | 2/2011 |
| EP | 2287090 A1 | 2/2011 |
| EP | 1894499 A1 | 7/2011 |
| EP | 2364930 A2 | 9/2011 |
| EP | 2384133 B1 | 11/2011 |
| EP | 2412645 A1 | 2/2012 |
| EP | 2444339 A1 | 4/2012 |
| EP | 2465792 A2 | 6/2012 |
| EP | 2484505 A2 | 8/2012 |
| EP | 2484605 A1 | 8/2012 |
| EP | 2343247 B1 | 11/2012 |
| EP | 2537778 A1 | 12/2012 |
| EP | 2559636 A1 | 2/2013 |
| EP | 2809006 A1 | 12/2014 |
| FR | 2556323 A1 | 6/1985 |
| FR | 2912124 A1 | 8/2008 |
| FR | 2963332 A1 | 2/2012 |
| GB | 1402799 A | 8/1975 |
| GB | 2061174 A | 5/1981 |
| GB | 2482032 A | 1/2012 |
| GB | 2485575 A | 5/2012 |
| GB | 2499201 A | 8/2013 |
| JP | S62-130649 A | 6/1987 |
| JP | S62-168512 A | 7/1987 |
| JP | H02289207 A | 11/1990 |
| JP | H0394377 A | 4/1991 |
| JP | H04176311 A | 6/1992 |
| JP | H05502817 A | 5/1993 |
| JP | H06510682 A | 12/1994 |
| JP | H11342078 A | 12/1999 |
| JP | 2001-017094 A | 1/2001 |
| JP | 2001-082699 A | 3/2001 |
| JP | 2001-250161 A | 9/2001 |
| JP | 2002-274000 A | 9/2002 |
| JP | 2002-347852 A | 12/2002 |
| JP | 2003-522567 A | 7/2003 |
| JP | 2003-235733 A | 8/2003 |
| JP | 2004-097015 A | 4/2004 |
| JP | 2005-199070 A | 7/2005 |
| JP | 2005-199071 A | 7/2005 |
| JP | 2006-510682 A | 3/2006 |
| JP | 2007-522856 A | 8/2007 |
| JP | 2007-530107 A | 11/2007 |
| JP | 2008-054840 A | 3/2008 |
| JP | 2008-510540 A | 4/2008 |
| JP | 2010-005003 A | 1/2010 |
| JP | 2010-500199 A | 1/2010 |
| JP | 2010-507418 A | 3/2010 |
| JP | 2010-528635 A | 8/2010 |
| JP | 2010-528737 A | 8/2010 |
| JP | 2013-529524 A | 7/2013 |
| JP | 2013-538609 A | 10/2013 |
| JP | 2014-504537 A | 2/2014 |
| JP | 2015-085086 A | 5/2015 |
| JP | 2017-507704 A | 3/2017 |
| JP | 2017-512082 A | 5/2017 |
| KR | 1020050107747 A | 11/2005 |
| KR | 20120114738 A | 10/2012 |
| MX | PA03011894 A | 3/2004 |
| NZ | 596919 A | 11/2013 |
| RU | 2380999 C2 | 2/2010 |
| RU | 2487067 A | 4/2012 |
| WO | 98/04460 A1 | 2/1998 |
| WO | 98/51396 A1 | 11/1998 |
| WO | 99/58035 A1 | 11/1999 |
| WO | 01/64416 A1 | 9/2001 |
| WO | 01/99047 | 12/2001 |
| WO | 02/078498 A1 | 10/2002 |
| WO | 03/073896 A1 | 9/2003 |
| WO | 2004/082390 A1 | 9/2004 |
| WO | 2005/044067 A1 | 5/2005 |
| WO | 2006/053635 A1 | 5/2006 |
| WO | 2006/121520 A2 | 11/2006 |
| WO | 2007/042414 A1 | 4/2007 |
| WO | 2007/042486 A2 | 4/2007 |
| WO | 2008/011913 A1 | 1/2008 |
| WO | 2008/090122 A2 | 7/2008 |
| WO | 2008/107645 A2 | 9/2008 |
| WO | 2008/126045 A1 | 10/2008 |
| WO | 2009/084061 A1 | 7/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |

(56) References Cited

FOREIGN PATENT DOCUMENTS

| | | |
|---|---|---|
| WO | 2010/013146 A3 | 4/2010 |
| WO | 2010/041179 A2 | 4/2010 |
| WO | 2010/085824 A1 | 8/2010 |
| WO | 2010/112353 A1 | 10/2010 |
| WO | 2010/118545 A2 | 10/2010 |
| WO | 2010/138563 A1 | 11/2010 |
| WO | 2010/137952 A1 | 12/2010 |
| WO | 2010/137960 A1 | 12/2010 |
| WO | 2011/000723 A2 | 1/2011 |
| WO | 2011/012501 A1 | 2/2011 |
| WO | 2011/147491 A1 | 12/2011 |
| WO | 2011/147553 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/019902 A1 | 2/2012 |
| WO | 2012/038063 A1 | 3/2012 |
| WO | 2012/080928 A1 | 6/2012 |
| WO | 2012/100975 A1 | 8/2012 |
| WO | 2012/100977 A1 | 8/2012 |
| WO | 2012/104760 A1 | 8/2012 |
| WO | 2012/135204 A1 | 10/2012 |
| WO | 2012/174331 A1 | 12/2012 |
| WO | 2012/175985 A1 | 12/2012 |
| WO | 2013/008012 A2 | 1/2013 |
| WO | 2013/029184 A1 | 3/2013 |
| WO | 2013/032330 A1 | 3/2013 |
| WO | 2013/043048 A1 | 3/2013 |
| WO | 2013/064988 A1 | 5/2013 |
| WO | 2013/136209 A1 | 9/2013 |
| WO | 2013/171663 A1 | 11/2013 |
| WO | 2013/189555 A1 | 12/2013 |
| WO | 2013/189923 A1 | 12/2013 |
| WO | 2014/001563 A1 | 1/2014 |
| WO | 2014/001564 A1 | 1/2014 |
| WO | 2014/006048 A1 | 1/2014 |
| WO | 2014/007639 A1 | 1/2014 |
| WO | 2014/067507 A2 | 5/2014 |
| WO | 2014/090567 A1 | 6/2014 |
| WO | 2014/102702 A1 | 7/2014 |
| WO | 2014/127863 A1 | 8/2014 |
| WO | 2014/128542 A1 | 8/2014 |
| WO | 2014/163497 A1 | 10/2014 |
| WO | 2012/000878 A2 | 1/2015 |
| WO | 2015/028425 A2 | 3/2015 |
| WO | 2015/039258 A1 | 3/2015 |
| WO | 2015/062703 A1 | 5/2015 |
| WO | 2015/075584 A1 | 5/2015 |
| WO | 2015/107484 A1 | 7/2015 |
| WO | 2015/124619 A1 | 8/2015 |
| WO | 2015/128527 A1 | 9/2015 |
| WO | 2016/077916 A1 | 5/2016 |
| WO | 2016/174671 A1 | 11/2016 |
| WO | 2016/186493 A1 | 11/2016 |
| WO | 2016/207845 A1 | 12/2016 |

OTHER PUBLICATIONS

International Preliminary Report on Patentability for International Application No. PCT/EP2016/066617, dated Jun. 9, 2017.
Rawle, Alan, "Particle Sizing—An Introduction" 2012; Silver Colloids, Edition or volume on Colloidal Silver.

* cited by examiner

FILTER ELEMENT HAVING A CUT-OUT

The present invention relates to a portion capsule for the production of a beverage, having a capsule body having a capsule base, a side wall and a collared periphery and a lid, wherein a cavity for receiving an pulverulent, granulate, cut-leaf shaped, or liquid beverage substrate is configured between the capsule base and the lid, and wherein a filter element is disposed in the cavity and the filter element is made from a fiber material. The present invention furthermore relates to a method for the production of a portion capsule.

Such portion capsules are known in general from the prior art, for example from WO 2012/038063, and are used for the production of tea or coffee beverages in automatic brewing apparatuses, for example. To this end, water is forced through the portion capsule by a pump, and a beverage substance herein is dissolved and/or extracted. However, the portion capsules that are known from the prior art do have the disadvantage that said portion capsules, in particular the filter element, have a comparatively high loss of pressure, that is to say that the positive pressure that has to be made available by the pump of the automatic brewing apparatus has to be substantially higher than 2 bar, and/or that the production of the portion capsules is complex, and/or that said portion capsules have a comparatively high weight.

It was therefore the object of the present invention to provide a portion capsule having a filter element, said portion capsule when compared to the prior art having a minor pressure loss.

This object is achieved by a portion capsule for the production of a beverage, having a capsule body having a capsule base, a side wall and a collared periphery and a lid, wherein a cavity for receiving a pulverulent granulate, cut-leaf shaped and/or liquid beverage substrate is configured between the capsule base and the lid, and wherein a filter element which has a cut-out in which no filtering material is provided is disposed in the cavity.

The explanations made in the context of this subject matter of the present invention apply equally to the other subject matter of the present invention, and vice versa.

The portion capsule according to the invention has the advantage that said portion capsule is comparatively easy to produce, has a large filter area having a minor pressure loss, and has a comparatively minor weight.

The portion capsule in the context of the present invention comprises a portion capsule that is preferably hermetically tight. This means that the beverage or foodstuff substrate, for example coffee powder, soup powder, or tea, that is located in the portion capsule prior to the extraction and/or dissolving procedure in relation to the environment is closed in a substantially aroma-tight manner. However, the portion capsule does not have to be hermetically tight but, prior to the use of said portion capsule, can also be provided in a hermetically tight packaging which then is opened, for example manually. Such portion capsules are typically opened at least on one side, preferably two sides, that is to say able to be percolated by the preparation liquid without said portion capsule being broached.

The portion capsules for the production of a beverage or of a foodstuff are preferably shaped in the manner of a truncated cone or a cylindrical manner, and are produced for example from a vacuum-formed plastic film or by the plastic injection-molding method. Said portion capsules usually have a closed capsule base and an open filling side having a collared periphery onto which a film lid is sealed or adhesively bonded once the cavity of the portion capsule has been provided with a filter element and has been filled with a granulate and/or leaf-shaped and/or cut-leaf shaped and/or pulverulent and/or liquid beverage substance.

A filter element which prevents the beverage substrate making its way into the prepared beverage or foodstuff is provided between the capsule base and the beverage substrate. This filter element is produced from fibers and according to the invention now has a cut-out in which no filtering material is provided. This cut-out preferably has an external diameter of 3 to 15 mm. The external diameter of the cut-out is preferably 5 to 40% of the available internal diameter of the capsule body in the region of the capsule base. Weight is saved by way of the cut-out. The cut-out can be employed for aligning the filter element in relation to the capsule body. The cut-out of the filter element is preferably provided in the region of the base of the portion capsule, and the peripheral region of the cut-out is preferably connected to the base of the capsule body. The cut-out is preferably located in the region of the center of the filter element. The filter element is preferably provided so as to be at least substantially rotationally symmetrical. The cut-out is particularly preferably located about the symmetry axis, particularly preferably so as to be rotationally symmetrical about the symmetry axis. The cut-out is preferably configured to be circular.

According to one further subject matter according to the invention or preferred subject matter of the present invention, the filter element is tack-welded to the capsule body.

The explanations made in the context of this subject matter of the present invention apply equally to the other subject matter of the present invention, and vice versa.

Tack-welded in the context of the local invention means that the filter element is connected to the capsule body but that this connection is performed only in a punctiform and/or portion-by-portion manner in relation to the circumference of the filter element, such that this connection does not have any liquid-sealing effect; rather, liquid can flow between two tack-welded locations. For example, the filter element along an annulus is connected to the capsule body only at a few locations and not in a continuous manner. This embodiment of the present invention has the advantage that in particular in the case of large filter elements or of filter elements that are suspended in the capsule body the filter element can be imparted a specific shape by way of which it is prevented, for example, that the filter element comes into contact with a broaching member. Moreover, the pressure loss of the filter element can be reduced by way of the tack-weld, and/or the filter area can be enlarged. The filter element can be tensioned by way of the tack-weld. Tack welding is preferably performed by way of sealing, preferably using ultrasound.

The filter element is disposed between the beverage substrate and the capsule base and/or the side wall of the capsule body, and preferably has a first and a second end which are particularly preferably mutually spaced apart, are in particular mutually separated by the side wall of the filter element. The water flows into the filter element in the region of the one end. The filter element preferably has a side wall through which the prepared beverage is at least in part drained. This side wall of the filter element at least in portions preferably runs parallel with the side wall of the capsule body. The side wall of the filter element can bear on the side wall of the capsule body. The side wall is preferably shaped in the manner of a truncated cone, or has a portion shaped in the manner of a truncated cone, or is provided to be parabolic. The filter element by way of the other end is preferably connected to the base of the capsule body. The filter element particularly preferably has a peripheral region which particularly preferably adjoins the first end of the filter element in an annular manner. The side wall is provided so as to be at an angle in relation to the peripheral region. The side wall and/or the peripheral region preferably have/has folds, and/or the filter element is vacuum-formed, that is to say said filter element while applying pressure and/or temperature is formed from a planar semi-finished product into a three-dimensional structure. The material thickness within the filter element preferably changes in vacuum-forming, and/or the arrangement of the fibers is modified. A central region which at least in portions preferably runs parallel with the base of the capsule body and/or is located in the region of the rotation axis of the filter element adjoins the side wall of the filter element in the base region of the capsule body. The cut-out of the filter element is preferably located in the central region. This central region is preferably connected to the base of the capsule body.

The side wall of the filter element when being fastened to the capsule base is preferably tensioned.

The filter element in the region of the first end thereof is connected to the capsule body. This connection is preferably performed in a materially integral manner, in particular by welding, preferably by ultrasonic welding. The connection can be performed in the region of the collared periphery and/or in the region of the side wall of the portion capsule. The filter element is preferably connected to the capsule body also in the region of the second end of said filter element, in particular connected to the internal side of the capsule base. At least one connection is preferably provided so as to be annular. At least one connection, particularly preferably both connections, is/are water-impermeable.

The circular or annular seal in the base region of the portion capsule preferably has an external diameter of 16 to 18 mm. The external diameter of the seal is preferably 5 to 45% of the available internal diameter of the capsule body in the region of the capsule base. The width of the sealing seam is preferably 0.5 to 2 mm.

The filter area is preferably between 1100 and 20,500 $mm^2$, particularly preferably between 2000 and 10,000 $mm^2$, and most particularly preferably between 6100 and 6900 $mm^2$.

The end of the filter element that is connected to the internal side of the capsule base is preferably flared. This flared feature can be performed by heating and subsequent forming and/or by an elastic deformation which is then in terms of the shape thereof stabilized by sealing.

The side wall of the filter element is preferably tensioned. On account thereof, the filter element, in particular the wall region of the latter, is imparted a specific shape which has a positive effect on the flow rate of the water through the filter and/or prevents the filter element being pierced by a broaching member, in particular in the region of the capsule base.

The filter element is preferably produced from a nonwoven fiber material, for example from a nonwoven material and/or felt, and prevents particles of the beverage substrate making their way into the beverage to be produced. The filter element can be provided in multiple plies, wherein the plies are preferably interconnected, for example by calendaring. One component part of the filter element is preferably paper and/or plastic and/or a naturally occurring material and/or a biologically degradable plastic and/or a plastic preferably from a sustainable raw material. PE and/or PP are preferred component parts of the fibers.

The filter element is preferably configured so as to be elastic. The side wall of the filter element can be tensioned on account thereof. A change in the shape of the filter element under the pressure of the liquid is at least minimized on account thereof.

In order for the portion capsule according to the invention to be produced, a capsule body is provided, the peripheral region of the filter element or the side wall of the filter element being sealed to the collared periphery or to the side wall of said capsule body, for example. Thereafter, the central region of the filter element is sealed to the capsule base, and the beverage substrate is subsequently filled into the capsule body. The portion capsule is subsequently closed with a film lid which is connected in particular by sealing to the peripheral region of the filter element and/or to the collared periphery of the capsule body. Alternatively, the filter element is connected to the capsule base and filled with the beverage substance. Finally, the film lid is sealed to the peripheral region of the filter element and in a substantially simultaneous manner, the peripheral region of the filter element is connected to the collared periphery of the portion capsule. The filter element herein is preferably tensioned. Potentially projecting material of the filter element can in particular subsequently be removed, for example by punching.

In order for a beverage, for example a coffee beverage, to be prepared, the portion capsule is incorporated in a brewing chamber of a preparation apparatus. After or during the closing procedure of the brewing chamber, the capsule, preferably on the closed base side thereof, is preferably opened by means of an opening mandrel that is disposed in the brewing chamber, wherein the opening mandrel preferably opens the peripheral region of the capsule base. After and/or when sealing the brewing chamber, the filling side of the portion capsule that is closed by way of a film lid is preferably opened by means of at least one piercing means. However, there are also portion capsules which are already opened at least on one side prior to being introduced into the preparation apparatus. A preparation liquid, preferably hot water, is subsequently conveyed under pressure through the film lid into the portion capsule. The preparation liquid percolates the beverage substrate and extracts and/or dissolves the substances that are required for the production of the beverage from the beverage substrate. The beverage thereafter flows through the filter element and from there into the capsule body, said beverage exiting the latter through an opening in the base region. In the case of the portion capsule according to the invention, a pump pressure of approx. 2 bar or less is sufficient in order for water to be conveyed through the portion capsule for the preparation of a coffee.

Yet another subject matter of the present invention is a method for the production of the portion capsule according to the invention, in which method the fitter material is formed and the first end and the second end are connected to the capsule body.

The explanations made in the context of the method according to the invention equally apply to the portion capsule according to the invention, and vice versa.

A cut-out can be incorporated into the filter material prior to, during, or after forming. The cut-out can be established by removing material, for example by means of cutting. However, a semi-finished product made from filter material can also already be pre-formed such that a cut-out results in the filter element in the forming of the filter. Furthermore alternatively, the configuration of the cut-out can be performed in an vacuum-forming procedure.

The filter element is preferably provided so as to be three-dimensional. For example, said filter element at least in portions is designed in the shape of a truncated cone or in a parabolic manner. According to one preferred embodiment of the present invention, the originally planar filter material is formed, in particular rolled and/or folded and/or elongated in an elastic or plastic manner in order for the filter element 5 to be produced.

One end of the filter material, in particular the end in the region of the base of the capsule body, is preferably flared. The flared feature preferably extends about the cut-out in the fitter material, in particular in the central region of the filter element. This flared feature is preferably established by a plastic and/or elastic deformation, for example under the influence of pressure and/or temperature.

The flared feature is preferably connected to the capsule base, in particular by welding, particularly preferably by ultrasonic welding.

The first end of the filter element, the water flowing into the filter element through the opening of said end, is preferably connected to the side wall and/or to the collared periphery of the capsule body, in particular by sealing, in particular by hot sealing, or welding, particularly preferably by ultrasonic welding on the side wall and/or on the collared periphery.

The filter element when being fastened to the capsule body is preferably tensioned.

The sealing seams for fastening the filter element to the capsule body are preferably disposed at least in part in a sequential manner.

According to one preferred embodiment of the present invention, the production of the sealing seams is performed by ultrasonic sealing by way of at least one sonotrode. The sonotrode is preferably brought into contact with the filter material through a radial widening in the region of the first sealing seam. The sonotrode is preferably brought into contact with the filter material in the base region by way of a movement of the sonotrode that is parallel with the central axis of the capsule body. The filter material is preferably formed and/or tensioned by way of the sonotrode.

Exemplary embodiments of the invention are illustrated in the figures and are explained in more detail in the description hereunder. The figures are described in a merely exemplary manner and do not limit the general concept of the invention. The description applies equally to all subject matter of the present invention.

Same parts are at all times provided with the same reference signs in the various figures and therefore are typically also referred to or mentioned only once, respectively.

Figure 1:
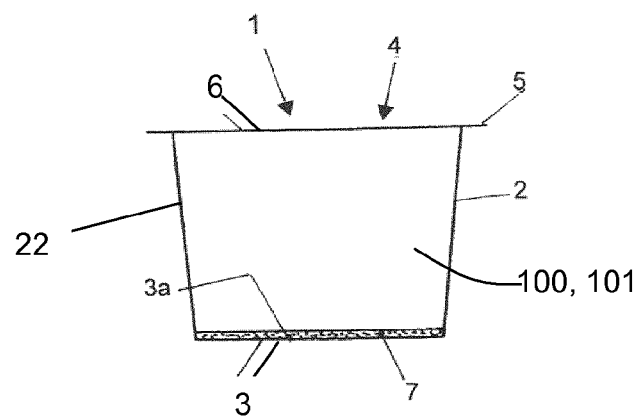
FIG. 1 shows a longitudinal section through a portion capsule according to the prior art, said portion capsule being configured for the preparation of espresso.

An embodiment of a portion capsule 1 according to the prior art is illustrated in FIG. 1. The portion capsule 1 comprises a capsule body 2 in the shape of a truncated cone, having a closed capsule base 3 and a collared periphery 5 which is disposed at the filling side 4 of said capsule body 2 and onto which a film lid 6 is welded, sealed, or adhesively bonded. A cavity 100 which is filled with a pulverulent and/or granulate and/or cut-leaf shaped beverage substance 101 and which is preferably closed in an air-tight and aroma-tight manner is thus configured between the capsule base 3 and the film lid 6. The beverage substance 101 herein comprises, for example, a coffee, cocoa, tea, and/or milk powder (or granulate, respectively). A filter element 7, composed from a non-woven fiber material, is preferably disposed on the internal side 3a of the closed capsule body base 3, that is to say within the cavity 100. In the case of the portion capsule according to the invention the filter element is preferably not planar and will be explained by means of FIGS. 3 to 5.

Figure 2:
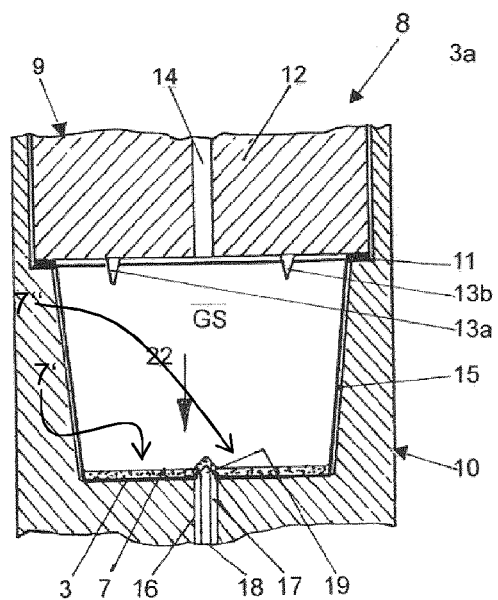
FIG. 2 shows a longitudinal section through a portion capsule according to the embodiment as per FIG. 1, said portion capsule lying in a closed brewing chamber.

A portion capsule 1 according to the one in FIG. 1 is illustrated in FIG. 2, wherein the portion capsule 1 in FIG. 2 is disposed in a closed brewing chamber 8. The brewing chamber 8 is composed of a first brewing chamber element 9 and of a second brewing chamber element 10, wherein the first brewing chamber element 9 in order for the portion capsule 1 to be introduced is provided so as to be movable in relation to the second brewing chamber element 10, or vice versa. A gasket 11 is disposed between the two brewing chamber elements 9, 10. The first brewing chamber element 9 is composed substantially of a closing piston 12 having piercing elements 13a, 13b for opening the film lid 6 of the portion capsule 1, of a preparation liquid infeed 14, and of the gasket 11. The second brewing chamber element 10 is composed substantially of a brewing chamber dome 15 that partially encloses the portion capsule 1 and has an opening mandrel 16 that is disposed on the base of the brewing chamber dome 15 and is provided with discharge grooves 17 and with a beverage drain 18, for example. In order for the portion capsule 1 to be received, the brewing chamber 8 is in an open state (not illustrated) in which the first and the second brewing chamber element 9, 10 are mutually spaced apart in order to guarantee infeeding of their portion capsule 1, and in the closed state illustrated, in which a preparation procedure for the production of a beverage by means of the portion capsule 1 can be carried out. The brewing chamber 8 in the closed state is closed in a pressure-tight manner. When the brewing chamber 8 is transformed from the open state to the closed state depicted, the film lid 6 is pierced by the piercing elements 13a, 13b such that preparation liquid, in particular hot brewing water, makes its way, preferably under pressure, through the preparation liquid infeed 14 into the cavity 100 of the portion capsule 1. Furthermore, the capsule base 3 is preferably perforated by the perforation means that is configured as the opening mandrel 16 when the brewing chamber 8 is being closed such that an exit opening 107 is preferably generated in the portion capsule 1 through which the prepared beverage liquid can exit from the portion capsule 1 in the direction of the beverage drain 18. In order for the discharge of the beverage liquid to be supported, the opening mandrel 16 on the shell face thereof here has the discharge grooves 17. The brewing chamber illustrated is in principle suitable for the production of a beverage or foodstuff, using the portion capsule according to the invention which is described by means of FIGS. 6 to 8.

Figure 3:
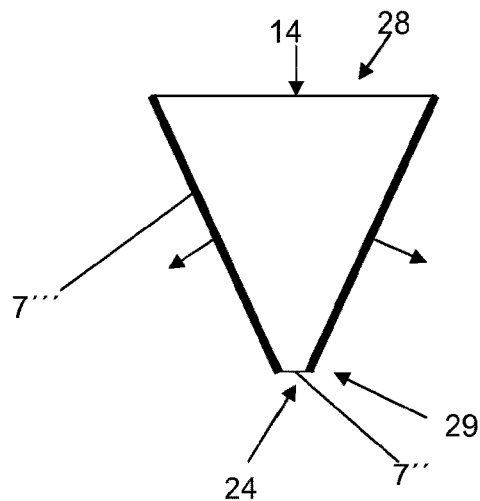
FIGS. 3-5 show in each case one embodiment of the filter element.

FIG. 3 shows a first embodiment of the filter element 7 of the portion capsule according to the invention, said filter element 7 in the present case being configured in the shape of a truncated cone. A person skilled in the art understands that the filter element can however also have another shape. The filter element defines a cavity in which the beverage substrate will be provided. The filter element has a first end 28 through which the water in the present case flows in and dissolves and/or extracts ingredient substances of the beverage substrate which is located within the filter element. The prepared beverage exits the filter element 7 in particular by way of the side wall 7''' of the filter element, flows into the capsule body, and from there through an opening into a container, for example a cup. The filter element according to the invention on the second end 29 thereof, in particular in the central region 7" of the filter element, has a cut-out 24. This cut-out preferably extends in a rotationally symmetrical manner about a central axis of the filter element. The cut-out is preferably circular. There is no woven filter fabric in the region of the cut-out.

Figure 4:
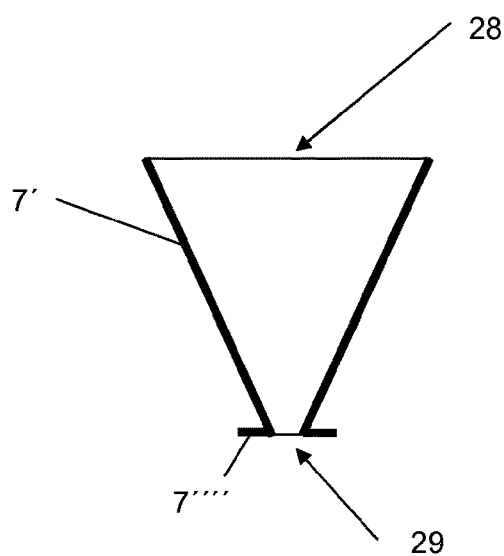

FIG. 4 shows a further embodiment of the filter element 7, wherein reference can be made substantially to the explanations according to FIG. 3. In the present example, the filter element in the region of the second end 29 thereof has a flared feature 7"" which has been produced by a plastic and/or elastic deformation of the filter element, for example under the influence of pressure and/or heat. The flared feature projects at an angle from the filter element, here in an outward manner, and can be used for fastening the filter element to the base of the portion capsule. Moreover, the flared feature stabilizes the shape of the filter element in the region of the cut-out.

Figure 5:
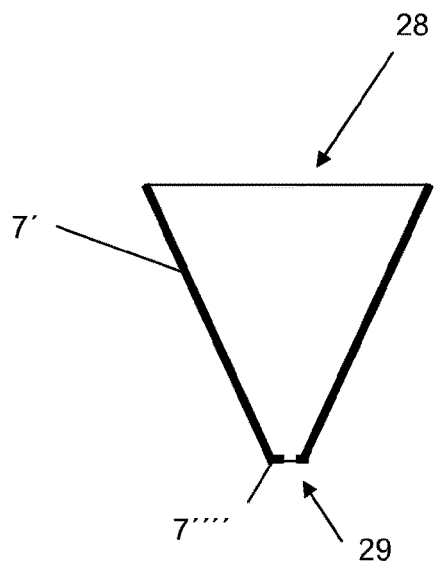

FIG. 5 shows yet one more embodiment of the filter element, wherein reference is made to the explanations according to FIGS. 3 and 4. The flared feature in the present case is directed inward and can thus be connected to the capsule base.

Figure 6:
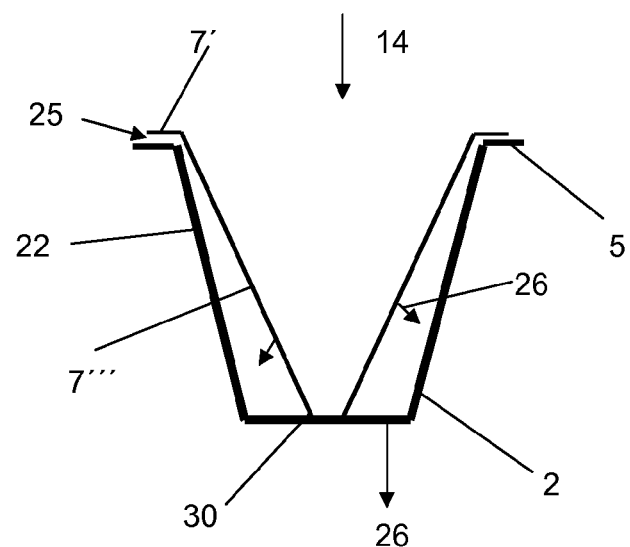
FIGS. 6-9 show in each case the portion capsule according to the invention.

FIG. 6 shows a first embodiment of the portion capsule according to the invention. The filter element in the present case has a peripheral region 7' which is provided at an angle in the region of the first end 28 of the filter element and in the present case is connected by means of the seal 25 to the collared periphery 5 of the portion capsule. The seal preferably extends in an annular manner. The second end 29 of the filter element is connected to the base region of the capsule by way of a seal, here an annular seal. The seal extends in an annular manner about the cut-out 24 of the filter element 7. As is illustrated by the arrow 22, the liquid, presently water, flows into the filter element and extracts or dissolves, respectively, the substances of the beverage substrate that are required for the production of the beverage. The prepared beverage flows into the portion capsule, as is illustrated by the arrow 26, and from there flows through the capsule base out of the portion capsule. Liquid does not run out of the cut-out 24. The filter element is preferably tensioned.

Figure 7:
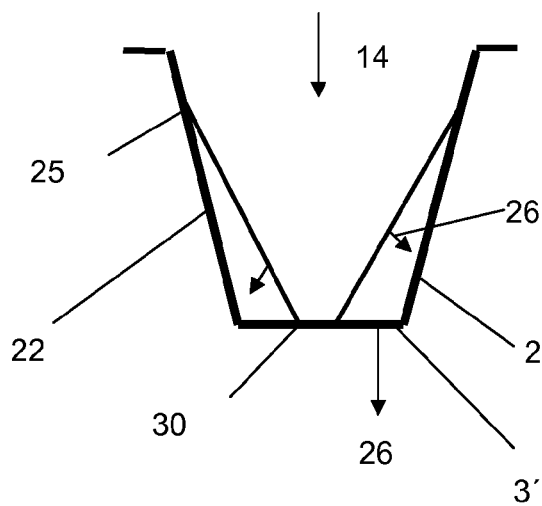

FIG. 7 shows a further embodiment of the portion capsule according to the invention, wherein reference can substantially be made to FIG. 6. The filter element in the present case has no peripheral region 7'. The side wall of the filter element here is connected to the capsule body by way of an annular seal 25.

In the case of both embodiments according to FIGS. 6 and 7 a flared feature which preferably by means of a seal, in particular an ultrasonic seal, is connected to the base of the capsule body can be provided in the peripheral region of the cut-out 24. The filter element, when being incorporated into the capsule body, is preferably tensioned. Furthermore preferably, the sealing seams in the base region and in the peripheral region, or on the side wall of the capsule body, respectively, are attached in a sequential manner. Both sealing seams are preferably made by a sonotrode, wherein the sonotrode can also shape the filter element. The sonotrode preferably penetrates the cut-out 24 of the filter element at least in part.

Figure 8:
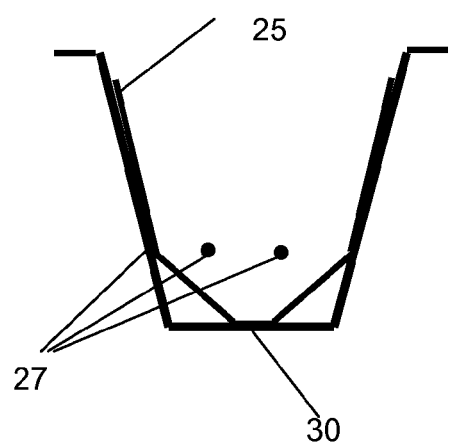

FIG. 8 shows yet another embodiment of the portion capsule according to the invention. The filter element in the present case is also connected to the capsule body by tack-welded points 27 between the two seals 25, 30. These tack-welds have the advantage that the filter element can be stabilized in a very specific shape, but that the filter area above the tack-welding nevertheless can participate in the filtering procedure. The seal 30 is optional in this embodiment of the portion capsule. The filter element 7 can optionally have the cut-out 24.

Figure 9:
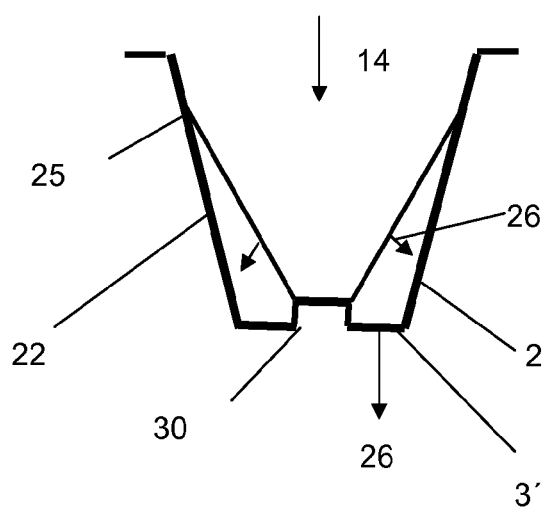

FIG. 9 shows yet another embodiment of the portion capsule according to the invention. In this case, the base region has a convexity. The filter element with or without the cut-out can be connected to the circumference and/or to the surface, in particular by welding or sealing. The surface can be embodied so as to be planar or curved.

In the case of all exemplary embodiments, the capsule can be opened by broaching, in particular by broaching the base region. However, it is also conceivable for the portion capsule, in particular the base region thereof, to be pre-perforated ex-works, wherein these pre-perforated holes are preferably closed by way of an aroma-tight fibs which is removed prior to the use of the portion capsule.

LIST OF REFERENCE SIGNS

1 Portion capsule
2 Capsule body
3 Capsule base
3a Capsule base internal side
3' Peripheral region of the capsule base
4 Filling side
5 Collared periphery
6 Lid, film lid
7 Filter element
7' Peripheral region of the filter element
7" Central region of the filter element
7'" Side wall of the filter element
7"" Fastening face, flared periphery
8 Brewing chamber
9 First brewing chamber element
10 Second brewing chamber element
11 Gasket
12 Closing piston
13a Piercing element
13b Piercing element
14 Preparation liquid Infeed
15 Brewing dome
16 Opening mandrel
17 Discharge grooves
18 Drain
19 Piercing tip
20 Concavity
21 Concavity/convexity
22 Side wall
23 Brewing dome base
24 Cut-out
25 First annular fastening, first annular seal, first seal
26 Prepared beverage
27 Tack-weld
28 First end of the filter
29 Second end of the fitter
30 Second annular fastening, second annular seal second seal
31 Flared feature
100 Cavity
101 Beverage substrate
106 Central point
107 Opening, exit opening

The invention claimed is:

1. A method for production of a portion capsule comprising: having a capsule body having a capsule base, a side wall and a collared periphery and a lid, wherein a cavity for receiving a pulverulent granulate or liquid beverage substrate is configured between the capsule base and the lid, wherein a filter element that is produced from fibers is disposed in the cavity, wherein the filter element has a cut-out in which no filtering material is provided, and wherein the filter element is formed, wherein the filter element has a first end and a second end, wherein the first end and the second end are connected to the capsule body, and wherein the first end and/or the second end is flared at a flared feature.

2. The method as claimed in claim 1, wherein the filter element is tack-welded to the capsule body.

3. The method as claimed in claim 1, wherein the filter element is vacuum-formed.

4. The method as claimed in claim 1, wherein the first end and the second end of the filter element are in each case sealed to the capsule body.

5. The method as claimed in claim 1, wherein the first end and the second end of the filter element are connected to the capsule body by way of an annular seal.

6. The method as claimed in claim 5, wherein an external diameter of the annular seal at the second end is about 16 to about 18 mm.

7. The method as claimed in claim 1, wherein the filter element is sealed in a region of the flared feature.

8. The method as claimed in claim 1, wherein material of the filter element is tensioned.

9. The method as claimed in claim 1, wherein the filter element has a portion in a shape of a hollow cone.

10. The use of a portion capsule as claimed in claim 1, for the production of a coffee, cocoa, tea, and/or milk beverage.

11. The method as claimed in claim 1, wherein the material of the filter element is rolled and/or folded.

12. The method as claimed in claim 1, wherein the flared feature is connected to the capsule base.

13. The method as claimed in claim 1, wherein the first end is connected to the side wall and/or to the collared periphery of the capsule body.

14. The method as claimed in claim 13, wherein the filter element when being fastened to the capsule body is tensioned.

15. The method as claimed in claim 1, wherein sealing seams are disposed in a sequential manner.

16. The method as claimed in claim 1, wherein sealing seams are established by ultrasonic sealing by way of at least one sonotrode.

17. The method as claimed in claim 16, wherein the sonotrode is brought into contact with the material of the filter element through a radial widening in a region of the sealing seams.

18. The method as claimed in claim 16, wherein the sonotrode is brought into contact with the material of the filter element in a base region by way of a movement that is parallel with a central axis of the capsule body.

19. The method as claimed in claim 1, wherein the filter element is formed and/or tensioned by way of a sonotrode.

* * * * *